United States Patent [19]

Kumazawa

[11] Patent Number: 4,727,256
[45] Date of Patent: Feb. 23, 1988

[54] SEMICONDUCTOR RADIATION DETECTOR

[75] Inventor: Yoshihiko Kumazawa, Kyoto, Japan

[73] Assignee: Shimadzu Corporation, Japan

[21] Appl. No.: 749,212

[22] Filed: Jun. 27, 1985

[30] Foreign Application Priority Data

Jun. 30, 1984 [JP] Japan ................................ 59-135492
Jun. 30, 1984 [JP] Japan ................................ 59-135493

[51] Int. Cl.$^4$ .............................................. G01T 1/24
[52] U.S. Cl. .................................................. 250/370
[58] Field of Search ........... 250/370 R, 370 G, 370 H

[56] References Cited

U.S. PATENT DOCUMENTS 3,803,416  4/1974  Strauss ........................ 250/370 G X
4,061,919  12/1977  Miller et al. ................ 250/370 G X
4,253,023  2/1987  Whited ................................ 250/370

OTHER PUBLICATIONS

*The Noise analysis and Optimum Filtering Techniques for a Two-Dimensional Position Sensitive Orthogonal Strip Gamma Ray Detector Employing Resistive Charge Division,* Gerber and Miller, Nuclear Inst. & Methods, No. 3 (1976), pp. 445–456.

Primary Examiner—Janice A. Howell
Assistant Examiner—David Porta
Attorney, Agent, or Firm—Franklin D. Wolffe; Morris Fidelman

[57] ABSTRACT

Semiconductor radiation detector comprising a radiation detecting element made of a compound semiconductor and operable at room temperature in response to a radiation event to produce a corresponding output signal; a preamplifier for preamplifying the output from the detecting element to produce a corresponding signal; and pulse shaping amplifier including a quasi-gaussian filter comprising a combination of a first differentiator and an integrator to shape and amplify the signal from the preamplifier; means for obtaining information about charge collection time at each radiation event by comparing the pulse height of a signal caused by the output from the differentiator and the pulse height of the output from the shaping amplifier; and means for correcting the pulse height of the output signal form the shaping amplifier in accordance with the information about charge collection time at each radiation event, thereby to improve the deterioration of the energy resolution caused by incomplete charge collection. There is also provided a semiconductor position-sensitive radiation detector which employs a plurality of the above-mentioned compound semiconductor radiation detecting elements so arranged in row and column as to form a matrix and which can be used effectively, for example, in nuclear medicine.

5 Claims, 22 Drawing Figures

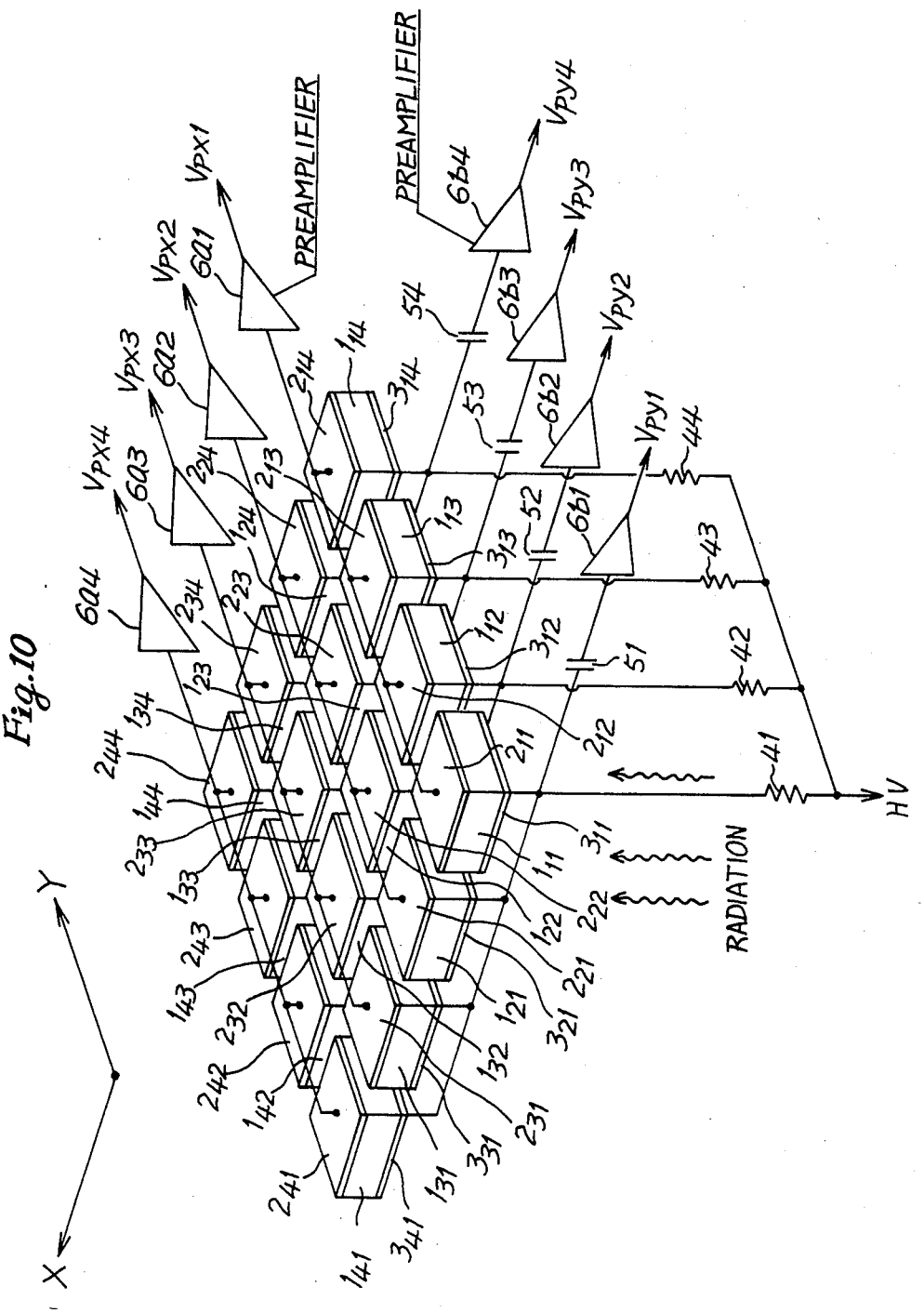

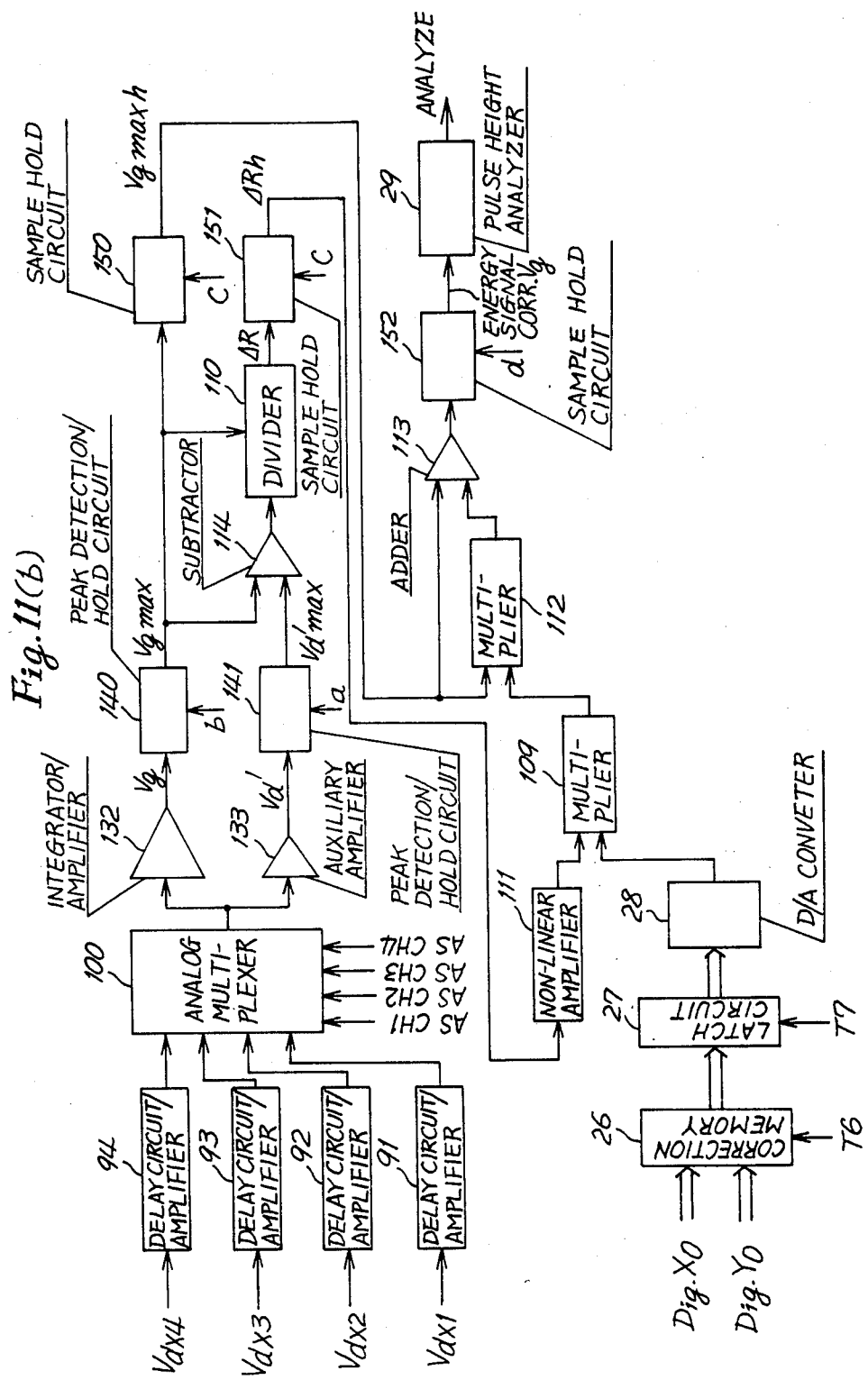

$\Delta R \equiv (1-R) = \dfrac{V_g max - k \cdot V_d' max}{V_g max}$ $R \equiv k \cdot V_d' max / V_g max$

SEMICONDUCTOR RADIATION DETECTOR

BACKGROUND OF THE INVENTION

This invention relates to a semiconductor radiation detector for use in engineering, nuclear medicine and other technical fields, In the radiation detector for use at room temperature which comprises a compound semiconductor such as CdTe, HgI$_2$, etc., the charge collection time or the rise time of the output signal of the preamplifier connected to the detector fluctuates greatly with the location at which the radiation has been absorbed in the detector because generally hole drift mobility $\mu$h is far smaller than electron mobility $\mu$e. This tendency becomes marked when measurement is conducted with gamma rays higher than 60 keV irradiating the detector through either one of the positive and negative electrodes thereof since the thickness of the detector (or the distance between the electrodes) or that of the depletion layer must be greater than 0.5 mm in view of the efficiency of detection and there is a limit to the voltage that can be impressed.

If the output signal of the preamplifier is shaped and amplified by a main amplifier and then analyzed by a multichannel pulse height analyzer (to be referred to as MCA hereinafter), the pulse height distribution becomes asymmetric with respect to the full energy absorption peak as shown in FIG. 7(a) with a tail extending at the low energy side due to the following two factors, so that it is difficult to attain a good energy resolution.

Factor (a):

Incomplete charge collection caused by the small value of the product of $\mu$h·$\tau$h (wherein $\tau$h is the mean free time for holes), that is, the tendency that positive holes are easily trapped into the hole trapping centers.

Factor (b):

The dependence of the pulse height of the output from the pulse shaping circuit on the rise time of the input signal to the circuit.

Factor (a) concerns the inherent property of the crystal of the semiconductor element and the value of $\tau$h varies greatly with the quality of the crystal, or the concentration of the positive hole trapping center. For further detail reference should be made to E. Sakai: "Present State of HgI$_2$ radiation detector" Applied Physics, 46(10) 1034(1977).

Factor (b) concerns solely the response characteristic of the electronic circuit and depends upon the type of the pulse shaping circuit (or filter) used and the shaping time constant thereof.

In FIG. 5 there is schematically shown a room-temperature radiation detector comprising a radiation detecting element 1 of a compound semiconductor such as CdTe or HgI$_2$ and a negative electrode 2 and a positive electrode 3 on the opposite sides of the element. Usually with high resistance type CdTe or HgI$_2$, the element 1 is the crystal itself with the electrodes 2 and 3 formed by aquadag (a trademark) painting or by vacuum-evaporating thereon a film of metal (Pd or Ge on HgI$_2$).

With low resistance type CdTe, the element 1 is a surface barrier type or a PN junction type. In the former case the whole crystal constitutes a sensitive layer, and in the latter case the sensitive layer is the depletion layer.

A negative bias voltage is impressed on the negative electrode 2, and a preamplifier 6 is connected to the positive electrode 3 and produces a voltage signal Vp. A main amplifier (or pulse shaping amplifier) 4 receives the signal to produce an energy signal Ve, which is analyzed by an MCA.

For convenience of explanation, the detector 1 is shown sandwiched between a pair of parallel plate electrodes, with the output signal being taken out from the positive electrode 3 through direct current coupling. Any other suitable method of taking out the output signal may also be employed.

Let the thickness of the sensitive layer be 1 and the distance between the negative electrode 2 and the position at which the incident radiation has been absorbed be x. At radiation events within the area where x/1 is sufficiently small, the positive holes move a short distance and the output signal is mainly caused by electrons so that the charge collecton time is short and complete charge collection is effected.

At radiation events with a greater value of x/1, however, the positive holes move a greater distance so that the charge collection time becomes longer and the previously mentioned factor (a) or the incompleteness of charge collection becomes marked. This tendency can be expressed by a solid line curve Vpmax in FIG. 6 as the dependence of the pulse height Vpmax of the output voltage from the preamplifier 6 upon x/1. In FIG. 6, instead of the information about the position of absorption, the charge collection time or the rise time tr of the output signal of the preamplifier 6 may be taken on the abscissa.

The shaping amplifier 4 has the previously mentioned factor (b), that is, the pulse height Vemax of its output signal depends upon the rise time of the input signal thereto. Generally, with the pulse height of the input signal being kept constant, the pulse height Vemax of the output signal tends to decrease as the rise time of the input signal increases. Therefore, Vemax/Vpmax decreases as the rise time increases. The dependence of Vemax on tr can be shown as a dot-and-dash line curve in FIG. 6.

When the energy signal Ve such as mentioned above caused by irradiation with single energy gamma rays is analyzed by a pulse height analyzer, the pulse height distribution curve obtained is asymmetric as shown in FIG. 7(a) with a tail traling at the low energy side of the full energy absorption peak. As shown in FIGS. 7(b) to 7(d), the pulse height distribution varies with the position at which the radiation is absorbed, and the energy absorption peak is shifted toward the low energy side as the value of x/1 increases.

The shaping amplifier 4 has four functions, that is, (1) amplification, (2) reduction of noise in the circuit, (3) production of pulses with a small width for improvement of the count rate characteristic, and (4) production of pulses with such a shape that can be processed with ease. The shape that makes it easy to process the pulse means that the pulse has a comparatively flat peak with respect to the time axis when pulse height analysis is to be conducted, for example.

There are various types of pulse shaping circuits or filters which can be used in the amplifier 4. Except the function of amplification, these filters have advantages and disadvantages with respect to the other functions. Circuit noise originates in the semiconductor detector and the input stage of the preamplifier and can be classified into series noise, parallel noise, flicker noise and others. The shaping time constant of the shaping circuit (which will be referred to merely as the time constant hereinafter) is defined more or less differently in different types of filters. In all of them, generally the smaller the time constant is, the greater the series noise becomes and the greater the time constant is, the greater the parallel noise becomes. The total circuit noise is minimized with such a time constant that both series and parallel noises become of the same level. Flicker noise does not depend upon the time constant.

On the other hand, the greater the time constant is, the longer the dead time becomes and the lower the count rate becomes. Therefore, the time constant is usually determined at a compromise between reduction of circuit noise and the count rate characteristic.

If the fluctuation of the charge collection time is so great that the previously mentioned factor (b), that is, the dependence of the pulse height of the output from the pulse shaping circuit upon the rise time tr of the output from the preamplifier 6 is not negligible, it is necessary to set the time constant (for example the peaking time) to a sufficiently long time as compared with the charge collection time, so that it is not always possible to select such a time constant as to satisfy the condition for minimum noise and that the count rate is reduced.

Usually a quasi-gaussian filter is often used as the pulse shaping circuit. This type of filter generally comprises a combination of a single differentiator and a plurality of integrators and enables substantial reduction of circuit noise with a relatively simple circuitry. In FIG. 9 the pulse shaping amplifier is shown as an amplifier 30 comprising a differentiator/amplifier 31 and an integrator/amplifier 32. Usually, the differentiator/amplifier 31 employs a single CR differentiator with pole-zero cancellation. In the integrator/amplifier 32 an RC integrator or a low-pass active filter is usually used as the integrator. The filter may comprise a single integrator or a plurality of integrators. The integrator/amplifier 32 often includes a baseline restorer. The amplifier 30 often includes a pileup rejection circuit, etc. With the quasi-gaussian filter used in the shaping circuit, however, disadvantageously the previously mentioned factor (b) is relatively great. The dependence of Vemax/Vpmax on tr is shown in FIG. 8 by way of example as dot-and-dash line curves a, a' and a'', with the time constant (peaking time) increasing in the order of a, a' and a''.

The single delay line clipping filter has an advantage that the previously mentioned factor (b) or dependence is very small as compared with other filters having substantially the same time constant. The clipping filter, however, has a disadvantage that it inherently has great circuit noise.

It has been reported that in a system such as a large volume germanium detector of the coaxial type whose charge collection time fluctuates (and in which the previously-mentioned factor (a) or incompleteness of charge collection is rarely recognized), by using a pseudo-trapezoidal filter which is a kind of time-variant filter or by shaping the signal by a quasi-gaussian filter and then integrating the shaped signal by a gated integrator for a predetermined period of time it is possible to eliminate the previously mentioned factor (b) or dependence with a short time constant thereby to achieve a good energy resolution and high count rate characteristic. For further detail reference should be made to the following documents:

(2) V. Radeka; "Trapezoidal Filtering of Signal from Large Germanium Detectors at High Rates." IEEE Trans. Nucl. Sci., NS-19(1) 412(1972).

(3) F. S. Goulding, et al.; "Signal Processing for Semiconductor Detectors." IEEE Trans. Nucl. Sci., NS-29(3) 1125(1982).

For comparison, the dependence of Vemax/Vpmax on tr with respect to the pseudo-trapezoidal filter is shown in FIG. 8 as a solid line curve b. This curve is obtained by integrating the output of the quasi-gaussian filter which produces the curve a for a predetermined period of time. Vemax/Vpmax is kept almost constant for about the same period of time as the integration time. The dead time, however, becomes longer than in the case of the curve a and about the same as in the case of the curve a'.

With respect to such compound semiconductor type radiation detectors for use at room temperature as mentioned above, there have been proposed two methods (A) and (B) of improving by means of circuitry the degradation of the energy resolution caused by the previously mentioned factors (a) and (b).

Method (A):

According to this method only those radiation events the x/l of which is sufficiently small are measured as shown in FIG. 7(b).

Method (B):

Since the full energy absorption peak is shifted to the low energy side as x/l increases as shown in FIGS. 7(b), 7(c) and 7(d), the signal caused by a radiation event with a greater value of x/l is amplified by a greater amplification degree (or the output Vemax is corrected by adding thereto or subtracting therefrom an amount which is a function of both x/l and Vemax), thereby to make the energy absorption peak less dependent on x/l.

Method (A) is described in, for example, (4) L. T. Jones; "The Use of Cadmium Telluride $\tau$ Spectrometers in Monitoring Activity Deposited in Nuclear Power Stations" Rev. Phys. Apl., 12,379(1977).

According to this method, at each radiation event the rise time tr of the output from the preamplifier is measured as the depth information x/l of the position of the radiation absorbed in the detector, so that those signals with a long rise time are omitted. This method (A) remarkably improves the energy resolution but greatly deteriorates the detection efficiency.

On the other hand, method (B) advantageously improves the energy resolution without appreciably lowering the detection efficiency as reported in the following:

(5) R. Kurz; "A Novel Pulse Processing System for $HgI_2$ Detectors." Nucl. Instr. and Meth., 150, 91(1978).

(6) M. Finger, et al.; "Energy Resolution Enhancement of Mercuric Iodide Detectors." IEEE Trans. Nucl. Sci., NS-31(1)348(1984).

In the method disclosed in literature (5) which is similar to the method disclosed in literature (4), the rise time tr of the output from the preamplifier is measured at each radiation event as the information about the depth x/l of the position of the radiation absorbed. The circuit employs a single delay line clipping filter, which causes large circuit noise and complication of the circuitry with two constant fraction discriminators and a time-to-amplitude converter to be provided.

In the method disclosed in literature (6), the output from the preamplifier is applied to two kinds of pulse shaping amplifiers, one of which is a quasi-gaussian filter with a great time constant and the other is a fast pulse processing circuit, so that by using the output signal S (slow) from the former filter and the output signal S (fast) from the latter circuit the information x/l about the depth of each radiation event in the detector is obtained to correct the signal S (slow).

The fast pulse processing circuit is so arranged that integration is conducted for about 100 ns upon passage of 50 ns from the rising point of the output signal of the preamplifier in order to obtain only signals caused mostly by movement of electrons. Therefore, the ratio S (fast)/S (slow) tends to decrease as x/l increases. Disadvantageously, however, the fast pulse processing circuit is complicated in structure and large errors are likely to be involved in measurement of gamma rays at relatively low energies such as for example 60 keV–140 keV.

In the methods described in documents (5) and (6) the time constant of each filter is set to a sufficiently great value to substantially eliminate the influence of the previously mentioned factor (b).

In the above explanation, detrapping of positive holes from the hole trapping center is neglected. Practically the situation is a little more complicated due to the influence by such detrapping. In principle, however, the situation can be improved by methods (A) and (B) although in method (B) the degree of correction and the nonlinearity of correction with respect to x/l are more or less different from in the above case where detrapping is negligible.

One object of the invention is to provide a semiconductor radiation detector which uses a compound semiconductor element as a radiation detecting element for use at room temperature and which is capable of improving the energy resolution which would otherwise be deteriorated by the incompleteness of the charge collection (the previously mentioned factor (a)) and the dependence of the output of the pulse shaping circuit on the rise time of the input thereto (the previously mentioned factor (b)) caused by the use of a compound semiconductor element, without substantially deteriorating the detection efficiency.

Among various expected applications of such semiconductor radiation detectors as mentioned above is a two-dimensional position-sensitive radiation detector for use particularly with gamma rays having energies above 60 keV for diagnosis in nuclear medicine. Several position-sensitive radiation detectors which employ $HgI_2$, etc. as a detecting element have been proposed in, for example, (7) D. Ortendahl, et al.; "Operating Characteristics of Small Position-Sensitive Mercuric Iodide Detectors." IEEE Trans, Nucl. Sci., NS-29(1)784(1982).

(8) C. Ortale, et al.; "Mercuric Iodide Detectors." Nucl. Instr. and Meth., 213,95(1983).

In designing such radiation detectors the following problems must be solved:

(I) Low energy resolution particularly at energies above 60 keV, (II) low uniformity of sensitivity, (III) low count rate, (IV) difficulty in making the detector head (particularly when a higher resolution and a wide field of view are required), (V) high manufacturing cost of the detector head, and (VI) relatively short life of the detector head (caused by degradation of the detecting element).

The problem (I) originates in the previously mentioned factor (a), that is, the incompleteness of charge collection and factor (b), that is, the dependence of the output from the pulse shaping circuit on the rise time tr of the input thereof.

The factor (a) primarily concerns the inherent quality of the crystal of the semiconductor detecting element. The lower the quality of the crystal is, the lower the energy resolution becomes, with resulting degradation of the uniformity of sensitivity (problem (II)).

To prevent this, a crystal of very high quality must be used for the detecting element in a large amount to provide a great number of detecting elements, with resulting increase in the manufacturing cost (problem (V)).

Deterioration of the characteristic of the detecting element caused by polarization effect occurring in connection with the factor (a), destruction by radiation and other causes (that is, reduction of the energy resolution and shifting of a peak in the energy spectrum) results in shortening of the useful life of the detecting element (problem (VI)).

To improve the reduction of the energy resolution caused by the previously mentioned factor (b), generally the time constant of the pulse shaping circuit must be set to a great value with resulting degradation of the count rate characteristic (problem (III)).

Another object of the invention is, therefore, to provide a two-dimensional position-sensitive radiation detector which comprises a plurality of radiation detecting elements of a compound semiconductor and which has an improved energy resolution, uniformity of sensitivity and count rate characteristic, and which can be used without trouble even with more or less variation in quality of the semiconductor crystal of different detecting elements, with resulting reduction of the manufacturing cost, and which has a long life of the detecting elements even with more or less deterioration of the crystal of the detecting elements by reducing its influence over the detector.

The invention will be described in detail with reference to the acompanying drawing.

BRIEF DESCRIPTION OF THE DRAWING

FIG. 10 is a schematic perspective view of the detecting portion of a position-sensitive radiation detector constructed in accordance with the invention;

FIGS. 11(a) and 11(b) are schematic block diagrams combined to show the signal processing system of the position-sensitive radiation detector;

SUMMARY OF THE INVENTION

Figure 1:
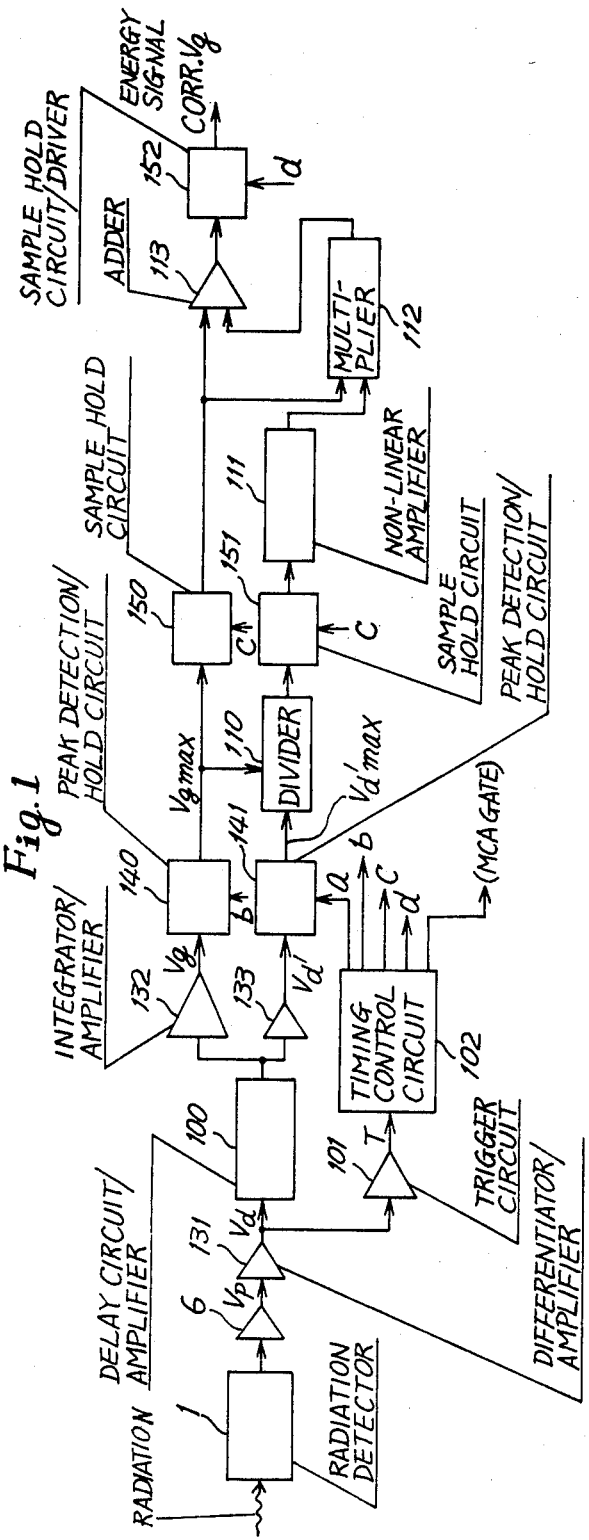
FIG. 1 is a schematic block diagram of a radiation detector constructed in accordance with the invention.

In accordance with the invention, there is provided a semiconductor radiation detector which comprises; a radiation detecting element made of a compound semiconductor and operable at room temperature in response to a radiation event to produce a corresponding current signal; means for preamplifying the current signal to produce a corresponding voltage signal; means for shaping and amplifying the voltage signal from the preamplifying means, including a quasi-gaussian filter comprising a combination of a differentiator and an integrator; means for obtaining information about charge collection time at each radiation event by comparing the pulse height of a signal caused by the output from the first differentiator and the pulse height of the output from the shaping and amplifying means; means for correcting the pulse height of the output signal from the shaping and amplifying means in accordance with the information about charge collection time at each radiation event, thereby to improve the deterioration of the energy resolution caused by incomplete charge collection.

There is also provided semiconductor position-sensitive radiation detector, which employs as radiation detecting means a plurality of compound semiconductor radiation detecting elements having a positive and a negative electrode and operable at room temperature, and being so arranged in row and column as to form a matrix.

The position-sensitive radiation detector further includes digital position signal producing means which comprises: a first group of preamplifiers each connected through a common line to the radiation detecting elements in each row of the matrix at one of the positive and negative electrodes so as to produce a first detection signal caused by a radiation event detected by each of the detecting elements in each row of the matrix; a first group of differentiator/amplifiers each connected to one of the first group of preamplifiers; a first group of discriminators each connected to one of the first group of differentiator/amplifiers to produce a first digital pulse signal; a first encoder for encoding the first digital pulse signal to produce a first digital position signal; a second group of preamplifiers each connected through a common line to the radiation detecting elements in each column of the matrix at the other of the positive and negative electrodes so as to produce a second detection signal caused by a radiation event detected by each of the detecting elements in each column of the matrix; a second group of differentiator/amplifiers each connected to one of the second group of preamplifiers; a second group of discriminators each connected to one of the second group of differentiator/amplifiers to produce a second digital pulse signal, and a second encoder for encoding the second digital pulse signal to produce a second digital position signal.

The position-sensitive radiation detector further comprises coincidence detecting means for checking whether the first and second detection signals coincide within a predetermined period of time to produce an output signal only when coincidence is detected; energy signal providing means including an analog multiplexer connected through a delay circuit to each of the differentiator/amplifiers in at least one of the first and second groups to produce an output, and an integrator/amplifier receiving the output from the multiplexer, the differentiator/amplifiers and integrator/amplifier being combined to form a main amplifier to produce a pulse-shaped energy signal; a pulse height analyzer for determining whether the energy signal is within at least one energy window; means including an auxiliary amplifier having a characteristic to amplify high frequency components with a higher gain than the integrator/amplifier and connected to the output of the multiplexer in parallel with the integrator/amplifier, and a circuit for comparing the height of the output from the auxiliary amplifier and that of the output from the integrator/amplifier, thereby to obtain information about the charge collection time at each radiation event detected by the detecting elements; means for correcting the energy signal relatively with respect to the energy window of the pulse height analyzer in accordance with the information about charge collection time at each radiation event, thereby to improve deterioration of the energy resulution which would otherwise be caused by incomplete charge collection; and means for adjusting the degree of correction by the correcting means at each radiation event in accordance with the contents read out from a memory addressed by the digital position signals obtained at each radiation event.

DESCRIPTION OF THE PREFERRED EMBODIMENTS

Figure 5:
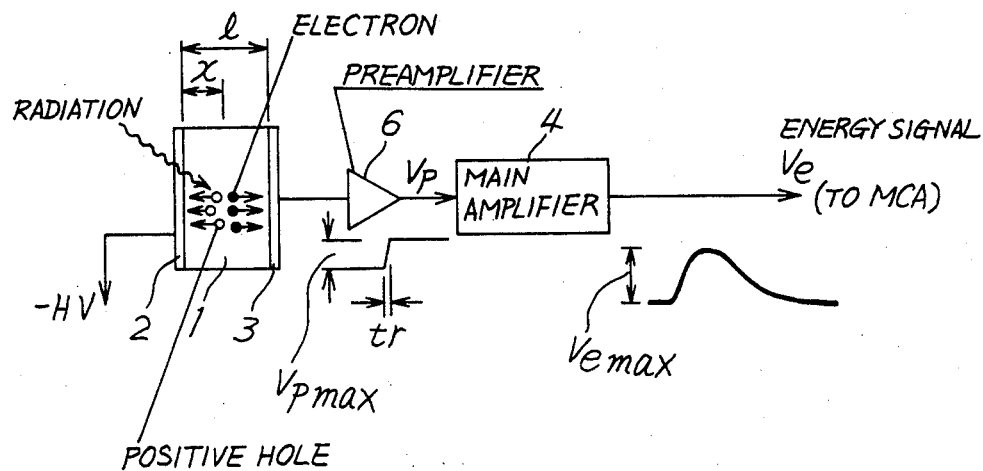
FIG. 5 is a schematic block diagram of a conventional radiation detector.
Figure 9:
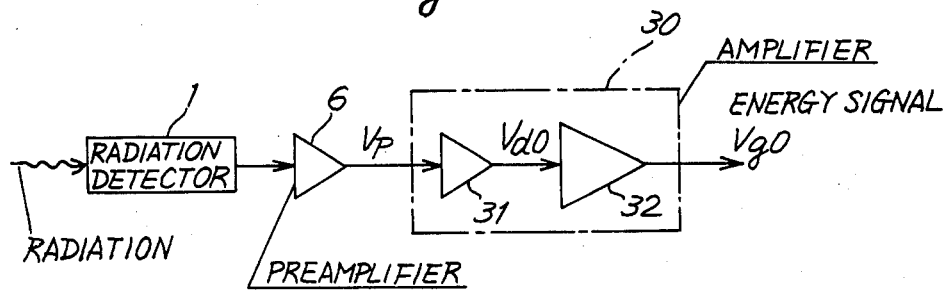
FIG. 9 is a schematic block diagram of a conventional radiation detector.

Referring to FIG. 1 there is shown an apparatus for detecting radiation comprising a radiation detector 1 operable at room temperature and a preamplifier 6, both of which are of the same structure and characteristic as the corresponding components shown in FIG. 5. The apparatus further comprises a differentiator/amplifier 131 and an integrator/amplifier 132 which are similar to the differentiator/amplifier 31 and the integrator/amplifier 32, respectively, shown in FIG. 9 and which constitute as a whole an amplifier including a quasi-gaussian filter.

The output Vd from the differentiator/amplifier 131 is applied to a delay circuit/amplifier 100 and a trigger circuit 101. The trigger circuit 101 can comprise a differentiator with a short time constant, a baseline restorer, a discriminator employing a comparator, etc., a pulse generator, a threshold voltage supplier, etc., and produces a trigger pulse T only when the input signal Vd or its differentiated signal exceeds a threshold level.

In the above-mentioned arrangement of the trigger circuit 101 the leading edge trigger method is used. Alternatively, the zero-crossing method or the constant fraction timing method using a delay line may also be employed.

The trigger pulse T is applied to a timing control circuit 102, which produces timing signals a, b, c and d to be described later in appropriately timed sequence. The circuit 102 also has a function to detect and remove pileup events and a function to refuse processing a signal caused by the next event while a signal caused by the preceeding event is being processed.

On the other hand, the signal Vd from the differentiator/amplifier 131 is delayed by the delay circuit/amplifier 100 a predetermined period of time, and then applied to the integrator/amplifier 132 and an amplifier 133, which produce output signals Vg and Vd', respectively. If the amplifier 133 includes a differentiator with a time constant smaller than that of the above-mentioned differentiator/amplifier 131 (whose time constant is usually equal to the time constant of the integrator/amplifier 132), the pulse width of the signal Vd' becomes smaller and the pulse height thereof becomes highly sensitive to fluctuation of the charge collection time tr within a range of comparatively small values of the time tr, with a relative increase in noise.

The signals Vd' and Vg are applied to peak detection/hold circuits or pulse stretchers 141 and 140, respectively, whose reset signals, gate signals, etc. are controlled by the timing signals a and b. The circuits 140 and 141 produce signals of the maximum height Vgmax and Vd'max, respectively, which are applied to a divider 110, which produces a signal corresponding to Vd'max/Vgmax. A sample hold circuit 151 is controlled by the timing signal c to take in and hold the signal corresponding to Vd'max/Vgmax while another sample hold circuit 150 is controlled by the timing signal c to take in and hold the output Vgmax from the peak detection/hold circuit 140. The output from the sample hold circuit 151 is rendered non-linear by a non-linear amplifier 111 and then applied to a multiplier 112, to which the output from the sample hold circuit 150 is also applied.

The output from the multiplier 112 and the output from the sample hold circuit 150 are both applied to an adder 113, which produces an output to be applied to and held in a sample hold circuit/driver 152 controlled by the timing signal d, so that an energy signal CORR.Vg is obtained.

In an application in which the signal CORR.Vg is analyzed by a multichannel pulse height analyzer, the timing control circuit 102 is so arranged as to produce a gate signal MCAGATE for the pulse height analyzer.

The principle of operation of the circuit shown in FIG. 1 is as follows: The corrected energy signal CORR.Vg can be expressed in terms of the uncorrected signal Vgmax as follows:

$$CORR.Vg = Vgmax(1 + f(tr)) \quad (1)$$
$$= Vgmax + Vgmax \cdot f(tr)$$

where f(tr) is a correction coefficient which is a function of the previously mentioned information about the depth of the position where the radiation is absorbed, that is, a function of the charge collection time tr.

Figure 2A:
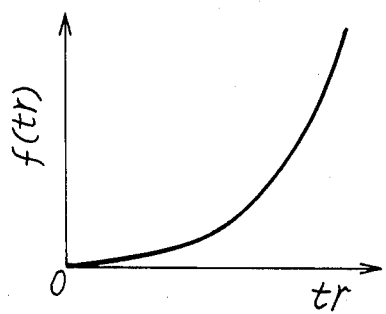
FIGS. 2(a), 2(b), 2(c) and 2(d) are graphs for explanation of the operation of the detector.
Figure 6:
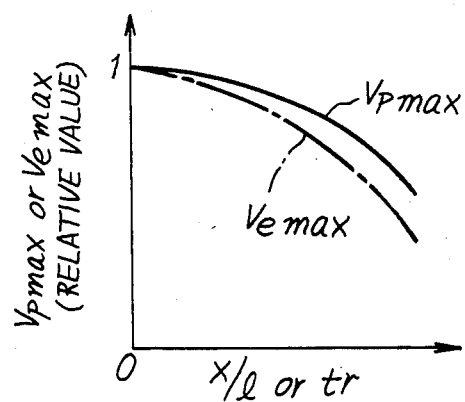
FIGS. 6, 7(a), 7(b), 7(c), 7(d) and 8 are graphs for explanation of the conventional radiation detectors.
Figure 7A:
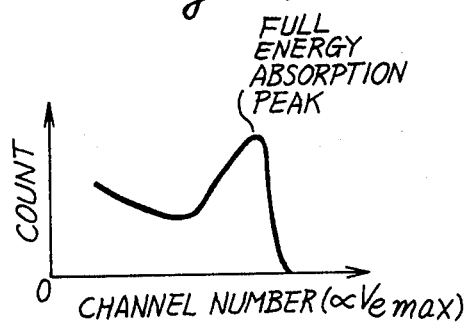
Figure 7C:
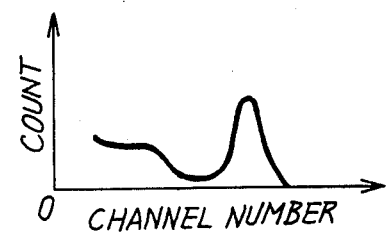
Figure 7B:
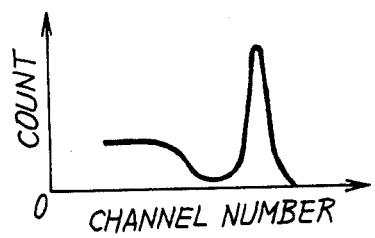
Figure 7D:
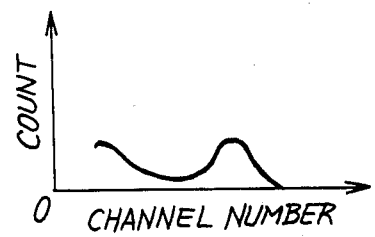

Suppose, for example, that the dependence of Vgmax on tr is expressed by a curve for the dependence of Vemax on tr shown in FIG. 6. If the function f(tr) as shown in FIG. 2(a) is used in expression (1) for correciton, it is possible to improve the energy resolution which would otherwise be degraded by the previously mentioned factor (a), that is, incompleteness of charge collection and factor (b), that is, the dependence of the output from the pulse shaping circuit on tr.

Figure 2C:
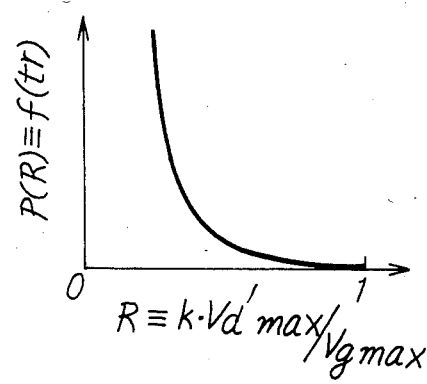
Figure 2B:
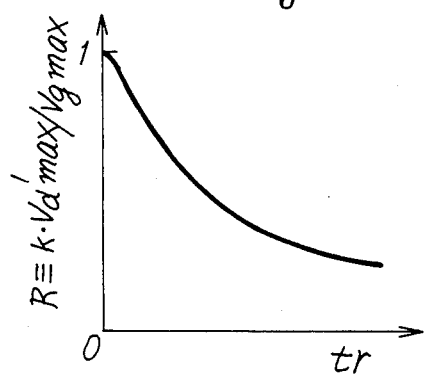
Figure 8:
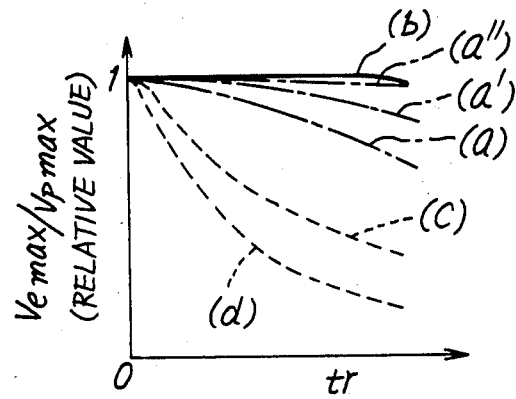

The pulse height value Vdmax of the output signal from the differentiator/amplifier 131 has a dependence on tr as shown for example by a broken line curve c in FIG. 8 (with Vdmax/Vpmax (relative value) taken along the ordinate in this case) which is greater than the dependence of Vgmax on tr. In this case, however, the dependence of Vdmax varies with the time constant of the differentiator, and the curve c is caused by about the same time constant as the curve a is. If the amplifier 133 includes a differentiator with a small time constant, the signal Vd'max from the amplifier 133 has a dependence on tr as shown for example by a broken line curve d in FIG. 8, where Vd'max/Vpmax (relative value) is taken along the ordinate. In this case, $$R \equiv k \cdot Vd'max/Vgmax \quad (2)$$

shows a dependence on tr as shown for example in FIG. 2(b) and can be used as a parameter for expressing the information x/l about the depth of a radiation event or the charge collection time tr. (In expression (2) the coefficient k is so determined that $k \cdot Vd'max = Vgmax$ with respect to events with tr≈0). Thus it is possible to express f(tr) as a function P(R) or R as expressed by expression (2), and to obtain a non-linear curve as shown in FIG. 2(c) from the curves as shown for example in FIGS. 2(a) and 2(b).

Returning to FIG. 1, the output from the divider 110 corresponds to R as defined by expression (2) and is transformed by the non-linear amplifier 111 into a signal corresponding to $P(R) = f(tr)$, and the multiplier 112 produces a signal corresponding to Vgmax·f(tr) in expression (1).

One embodiment of the invention has been described above, and there are various modifications without departing from the scope of the invention.

Since the integrator/amplifier 132 generally has a longer propagation time than the amplifier 133, the integrator/amplifier 132 may be so arranged as to receive an input earlier than the amplifier 133 without using the delay circuit/amplifier 100 in common.

The output signals Vgmax and Vd'max from the peak detection/hold circuits 140 and 141 may be once held by separate sample hold circuits and then applied to the divider 110 and the sample hold circuit 150.

Figure 2D:
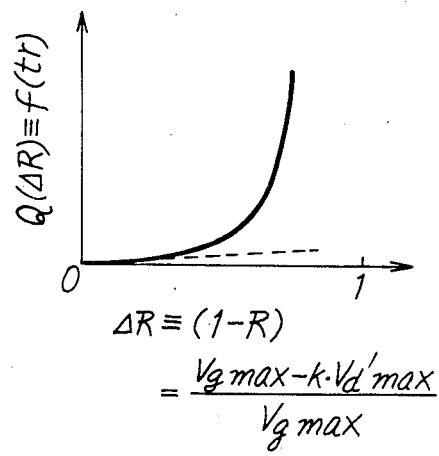

The curve shown in FIG. 2(c) can be expressed as in FIG. 2(d). Let $$\Delta R \equiv 1 - R \quad (3)$$
$$= (Vgmax - k \cdot Vd'max)/Vgmax,$$

and the correction coefficient f(tr) can be expressed as Q(ΔR), a function of ΔR. In this case, a subtractor is added before the divider 110 in FIG. 1 so that the output from the divider 110 corresponds to ΔR as defined by expression (3) instead of R as defined by expression (2) thereby to cause the output from the non-linear amplifier 111 to become a function monotonously increasing in response to the input thereto.

Suppose that as a first approximation to the above modified embodiment a function Q(ΔR) as shown by a broken line in FIG. 2(d) can be defined as follows within a range of relatively small values of ΔR:

$$Q(\Delta R) \equiv f(tr) \approx \alpha \cdot R \quad (4)$$

where α is a proportional constant.

Substituting expressions (3) and (4) into expression (1), we obtain $$CORR.Vg \approx Vgmax + \alpha(Vgmax - k \cdot Vd'max) \quad (5)$$
$$= CORR.Vg'.$$

Figure 3:
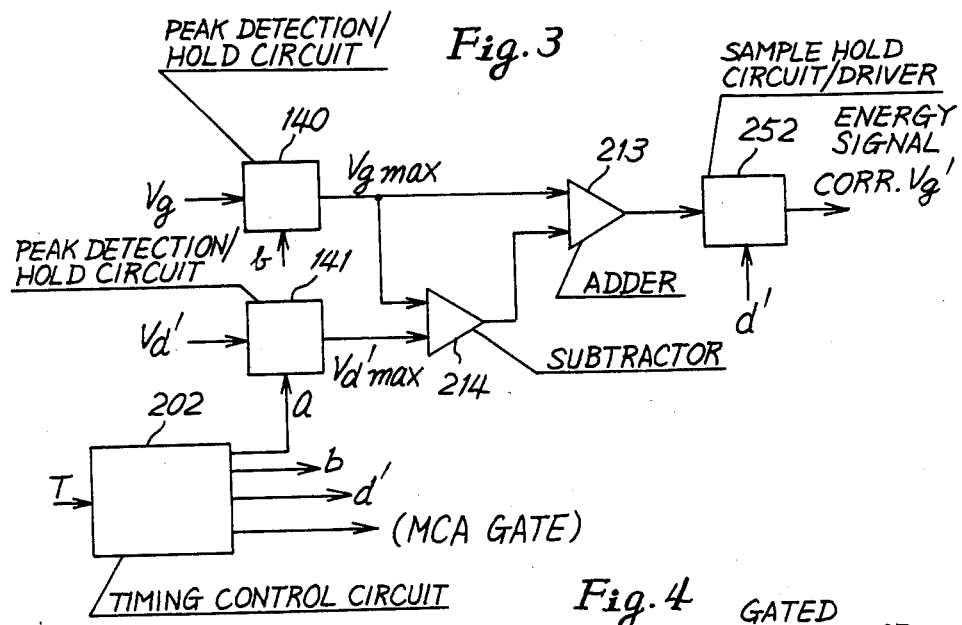
FIGS. 3 and 4 are schematic block diagrams of different embodiments of the invention.

A circuit arrangement for this modification is shown in FIG. 3 including peak detection/hold circuits 140 and 141 as in FIG. 1, and a timing control circuit 202 which operates in response to a trigger pulse T to produce timing signals a, b and d' and a gating signal MCAGATE for the multichannel analyzer in an appropriately timed sequence. The output signals Vgmax and Vd'max are applied to a subtractor 214, which produces a signal corresponding to (Vgmax−k·Vd'max). This signal and the signal Vgmas are applied to an adder 213 which performs an operation corresponding to expression (5) to produce an output, which is fed to and held in a sample hold circuit/driver 252 operating in response to the timing signal d', so that an energy signal CORR·Vg' is obtained.

The above approximation is very useful for the following reasons. As shown by the solid line curve in FIG. 2(d), even if the degree of correction is higher, within a range of larger $\Delta R$ a large error is inherently inevitable in correction with resulting reduction of reliability. Besides in FIG. 3 the multiplier, the non-linear amplifier, etc. in FIG. 1 can be dispensed with, so that the circuitry can be simplified.

In another modified embodiment of the invention, a psuedo-trapezoidal filter comprising a combination of a quasi-gaussian filter and a gated integrator may be used in the pulse shaping amplifier. In this case, the previously mentioned factor (b), that is, the dependence of the output from the pulse shaping circuit on tr is very small as shown by the solid line curve b in FIG. 8 so that the other factor (a), that is, incompleteness of charge collection is the chief cause for deterioration of the energy resolution.

Figure 4:
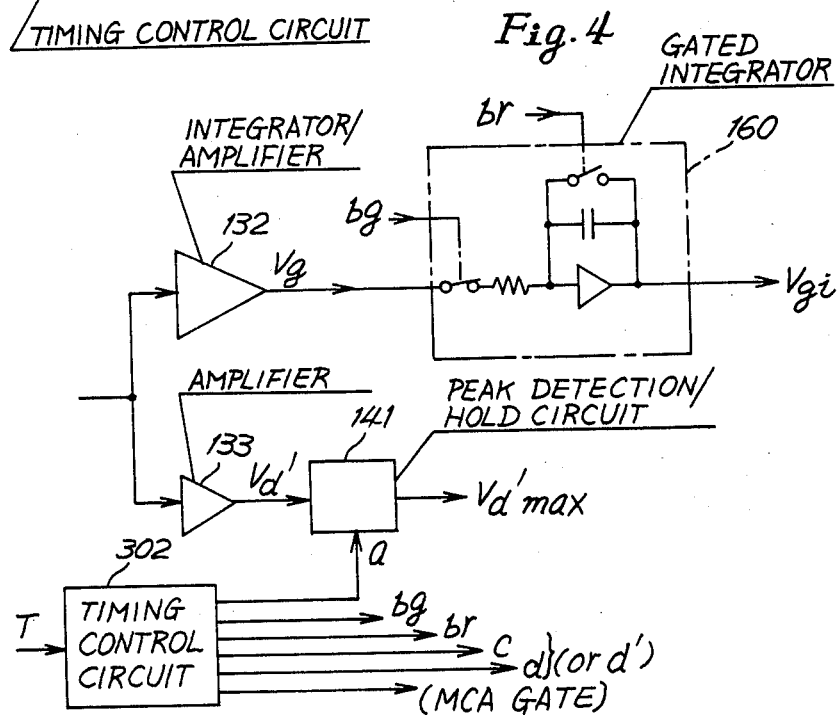

A circuit arrangement of this modified embodiment is shown in FIG. 4 including an integrator/amplifier 132, an ampliifer 133 and a peak detection/hold circuit 141 as in FIG. 1. A timing control circuit 302 operating in response to a trigger pulse T to produce timing signals a, bg, br, c, and d(or d') and a gating signal MCAGATE for a multichannel analyzer in appropriately timed sequence.

The output signal Vg from the integrator/amplifier 132 is applied to a gated integrator 160 for integration for a predetermined period of time to produce an output signal Vgi. The gated integrator 160 is provided with a gate switch controlled by the timing signal bg and a reset switch controlled by the timing signal br so that the integrator has a hold function.

Provision of a voltage/current converter in front of the integrator 160 improves the linearity of integration over a wide range of the input signal.

The output signal Vgi from the integrator 160 is processed in substantially the same manner as the signal Vgmax in FIG. 1 or 3. Thus the signal Vgi is corrected in view of the relation between the signals Vgi and Vd'max to obtain a corrected energy signal.

In the arrangement of FIG. 1, the time constant of the quasi-gaussian filter is changed by changing the time constant of the differentiator in the differentiator/ampliifier 131. The signal Vd and consequently the signal Vd' also change with the time constant with resulting inconvenience in practical use of the detector. Therefore, the time constant of the differentiator in the differentiator/ampliifer 131 may be fixed at $\tau_0$, and the integrator/amplifier 132 may be provided with a differentiator with a variable time constant $\tau$ so that the quasi-gaussian filter as a whole may have a time constant $\tau$ variable within a range of $\tau \leq \tau_0$.

The semiconductor radiation detector may effectively be used in a position-sensitive radition detector as shown in FIGS. 10 to 14.

Referring to FIG. 10 there are shown a plurality of compound semiconductor elements $1_{11}$–$1_{44}$ each being sandwiched between a parallel pair of electrodes plates $2_{11}$–$2_{44}$ and $3_{11}$–$3_{44}$ so as to form a radiation detector. For convenience of explanation, the detectors are so arranged so as to form a 4×4 matrix. In each of the three-digit numbers $1_{ij}$ designating the elements $1_{11}$–$1_{44}$ the numeral i designates the position of the element in each of the four rows of the matrix (or in the X direction) and the numeral j designates the position of the element in each of the four columns thereof (or in the Y direction).

Radiation impinges on the electrodes $3_{11}$–$3_{44}$ through a collimator not shown but provided adjacent the electrodes $3_{11}$–$3_{44}$. The opposite electrodes $2_{11}$–$2_{44}$ are connected to preamplifiers $6a1$–$6a4$ through a direct current coupling so as to be imaginarily grounded. In particular, the electrodes $2_{11}$, $2_{12}$, $2_{13}$ and $2_{14}$ are connected by a common signal line to a preamplifier $6a1$ to produce a voltage output Vpx1. Similarly, the electrodes $2_{21}$, $2_{22}$, $2_{23}$ and $2_{24}$ are connected to a preamplifier $6a2$ to produce a voltage output Vpx2; the electrodes $2_{31}$, $2_{32}$, $2_{33}$ and $2_{34}$, to a preamplifier $6a3$ to produce a voltage output Vpx3; and the electrodes $2_{41}$, $2_{42}$, $2_{43}$ and $2_{44}$, to a preamplifier $6a4$ to produce a voltage output Vpx4.

On the other hand, the biased electrodes $3_{11}$–$3_{44}$ are connected to corresponding preamplifiers $6b1$–$6b4$ through alternate current coupling. In particular, the electrodes $3_{11}$, $3_{21}$, $3_{31}$ and $3_{41}$ are connected by a common signal line to a high voltage source HV through a bias resistor 41 on the one hand and to a preamplifier $6b1$ through a capacitor 51 on the other hand to produce a voltage output Vpy1. In a similar manner the electrodes $3_{12}$, $3_{22}$, $3_{32}$ and $3_{42}$; $3_{13}$, $3_{23}$, $3_{33}$ and $3_{43}$; and $3_{14}$, $3_{24}$, $3_{34}$ and $3_{44}$ are connected to the high voltage source HV through bias resistors 42, 43 and 44 on the one hand and to preamplifiers $6b2$, $6b3$ and $6b4$ through capacitors 52, 53 and 54 on the other hand to produce voltage outputs Vpy2, Vpy3 and Vpy4, respectively.

Figure 11A:
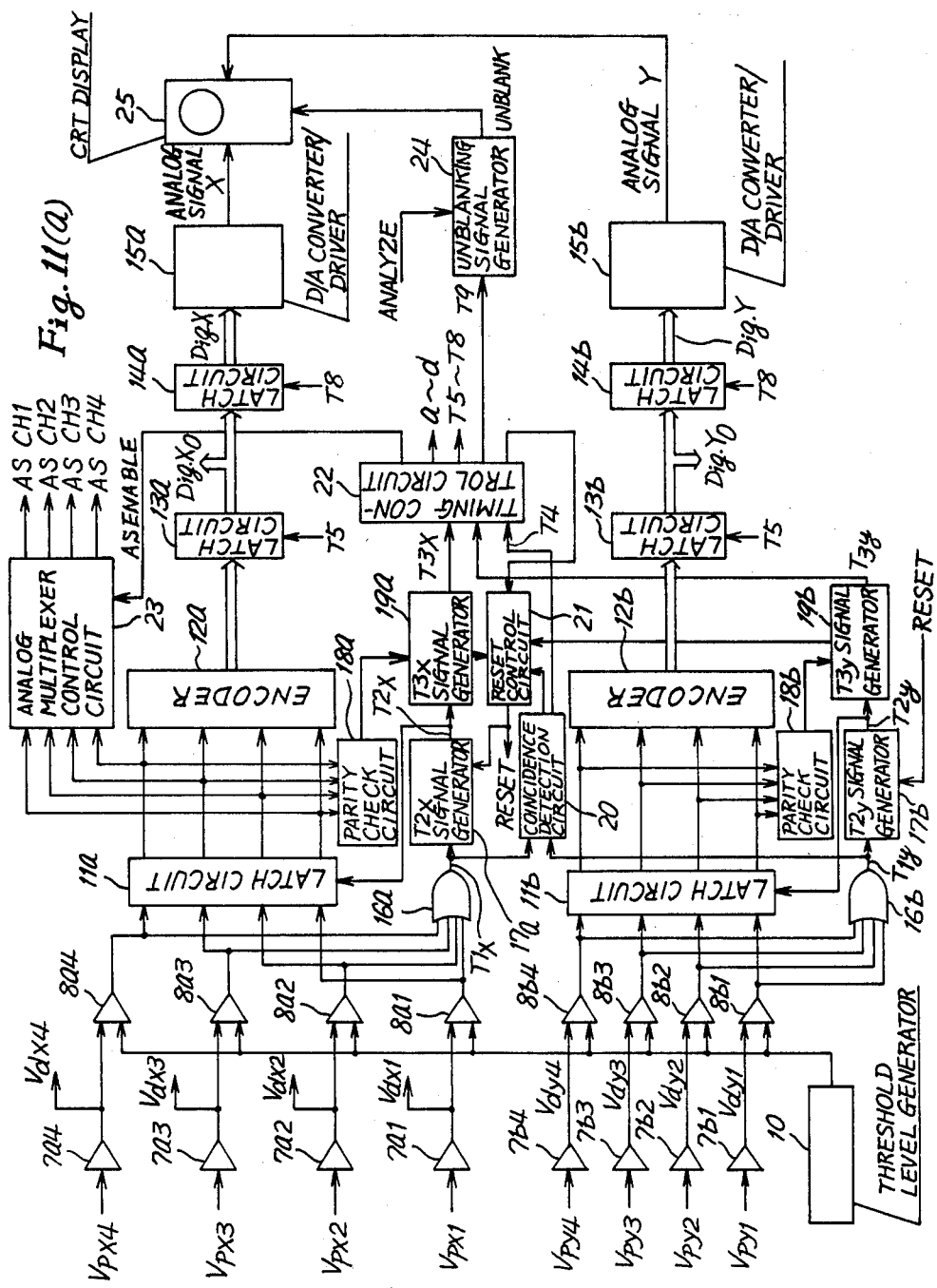

FIGS. 11(a) and 11(b) show a circuit for processing the above-mentioned voltage outputs Vpx1–Vpx4 and Vpy1–Vpy4. The outputs Vpx1–Vpx4 from the preamplifiers $6a1$–$6a4$ containing the information about the detector position in the X direction are applied to corresponding amplifiers $7a1$–$7a4$ each including a differentiator. The amplifiers $7a1$–$7a4$ produce corresponding outputs Vdx1–Vdx4, respectively, which are applied to corresponding trigger circuits $8a1$–$8a4$ and delay circuit/amplifiers 91–94 (FIG. 11(b)), respectively.

Each of the trigger circuits $8a1$–$8a4$ may comprise a differentiator with a short time constant, a baseline restorer, a discriminator using a comparator, a pulse generator, etc. and produces a digital pulse signal only when the input signal thereto or the differentiated signal therefrom exceeds the threshold voltage VTH supplied from a threshold level generator 10. The trigger circuits $8a1$–$8a4$ may employ the leading edge trigger method, the zero-crossing method, or the constant fraction timing method using a delay line.

The digital pulse signals from the trigger circuits $8a1$–$8a4$ are applied to an OR circuit 16a and a latch circuit 11a. When at least one of the trigger circuits $8a1$–$8a4$ produces a pulse signal, the OR circuit 16a produces a pulse signal T1x, which is applied to a T2x signal generator 17a and a coincidence detection circuit 20. Upon production of the signal T1x normally the T2x signal generator 17a promptly applies a corresponding signal T2x to the latch circuit 11a so as to fix the contents therein. The latch circuit 11a comprises for example a D-type latch circuit or a D-type flip-flop.

The outputs from the latch circuit 11a whose contents have been fixed are fed into an encoder 12a so as to be transformed into a corresponding code, which is then applied to a latch circuit 13a. The outputs from the latch circuit 11a are also applied to a parity check circuit 18a, and the parity information (an even or odd number) obtained is applied to a T3x signal generator 19a.

The outputs from the latch circuit 11a are also applied to an analog multiplexer control circuit 23, which is controlled by a timing signal ASENABLE to be described later to produce either of four signals ASCH1-ASCH4.

The signal T2x from the generator 17a is also applied to the T3x signal generator 19a, which checks on the basis of the above-mentioned parity information whether two or more of the trigger circuits 8a1-8a4 do not produce a pulse signal simultaneously, and produces a corresponding signal T3x unless two or more signals are produced simultaneously. The signal T3x is applied to a timing control circuit 22. Although the checking method using the parity check circuit 18a is simple, it is impossible to check when three of the trigger circuits produce a signal simultaneously. Therefore, in an application where a very high count rate is required for measurement, a different checking method is needed.

With respect to the output signals Vpy1-Vpy4 containing information about the detector position in the Y direction, there is provided a similar circuit arrangement to the above-mentioned one for the signals Vpx1-Vpx4 except for the delay circuit/amplifiers 91-94, the analog multiplexer control circuit 23, and the other circuit elements connected thereto.

The outputs Vpy1-Vpy4 from the preamplifiers 6b1-6b4 are applied to corresponding amplifiers 7b1-7b4 each containing a differentiator. The amplifiers 7b1-7b4 produce corresponding output signals Vdy1-Vdy4, respectively, which are applied to corresponding trigger circuits 8b1-8b4, which produce a digital pulse signal only when the input signal thereto or the differentiated signal therefrom exceeds the threshold voltage VTH supplied from the threshold level generator 10.

The digital pulse signals from the trigger circuits 8b1-8b4 are applied to an OR circuit 16b and a latch circuit 11b. When at least one of the trigger circuit 8b1-8b4 produces a pulse signal, the OR circuit 16b produces a pulse signal T1y, which is applied to a T2y signal generator 17b and the previously mentioned coincidence detection circuit 20. Upon production of the signal T1y normally the T2y signal generator 17b promptly applies a corresponding signal T2y to the latch circuit 11b to fix the contents therein.

The outputs from the latch circuit 11b whose contents have been fixed are applied to an encoder 12b so as to be transformed into a corresponding code, which is then applied to a latch circuit 13b. The outputs from the latch circuit 11b are also applied to a parity check circuit 18b, and the parity information obtained is applied to a T3y signal generator 19b.

The signal T2y from the generator 17b is also applied to the T3y signal generator 19b, which checks on the basis of the above-mentioned parity information whether two or more of the trigger circuits 8b1-8b4 do not produce a pulse signal simultaneously, and produces a corresponding signal T3y unless two or more signals are produced simultaneously. The signal T3y is applied to the previously mentioned timing control circuit 22.

The coincidence detection circuit 20 checks whether the pulse signals T1x and T1y coincide within a predetermined period of time, and produces a signal T4 when the two pulses coincide. The signal T4 is applied to the timing control circuit 22. At least one of the signals T3x, T3y and T4 is a timing signal. When all of the signals T3x, T3y and T4 have been applied to the timing control circuit 22, the circuit 22 produces a series of timing signals a-d, ASENABLE, T5-T9, etc. in their respective timed sequences.

The timing signal T5 fixes the contents of the latch circuits 13a and 13b, which produce digital position signals Dig.Xo and Dig.Yo, respectively. These signals are applied to corresponding latch circuits 14a and 14b, respectively, whose contents are fixed by the timing signal T8, and the circuits 14a and 14b produce digital position signals Dig.X and Dig.Y, respectively.

The signals Dig.X and Dig.Y are applied to corresponding D/A converter/drivers 15a and 15b, respectively. The analog position signals X and Y thus obtained as well as an unblanking signal UNBALANK to be described later are applied to a CRT display 25, so that a two-dimensional image is displayed on the screen thereof.

Although not shown in FIG. 11(a), there is preferably provided a random number generator (which may comprise a counter) so that in each of the latch circuits 14a and 14b the output from the random number generator is added to the lower bit of the code signal from each of the encoders thereby to prevent concentration of an image on each picture element and ensure a clear view of the image on the CRT screen.

Each of the delay circuit/amplifiers 91-94 comprises a delay line and an amplifier with a baseline restorer. The outputs Vdx1-Vdx4 from the amplifiers 7a1-7a4 with a differentiator are applied through the corresponding delay circuit/amplifiers 91-94 to an analog multiplexer 100. The analog multiplexer control circuit 23 produces output signals ASCH1-ASCH4, by which the analog multiplexer 100 is controlled so that the outputs from only those of the delay circuit/amplifiers 91-94 which correspond to those of the trigger circuits 8a1-8a4 which have produced an output, are applied to an integrator/amplifier 132 and an auxiliary amplifier 133. The analog multiplexer 100 may comprise analog switches and an adder and help reduce circuit noise to a lower level than if simple addition were conducted. The integrator/amplifier 132 and the auxiliary amplifier 133 produce output signals Vg and Vd', respectively.

The amplifiers 7a1-7a4 each containing a differentiator and the integrator/amplifier 132 are combined to form a main amplifier which performs pulse shaping for production of energy signals. For example, if each of the amplifiers 7a1-7a4 is composed of a single CR differentiator (which usually uses pole-zero cancellation) and an amplifier, and the integrator/amplifier 132 is composed of more than one RC integrator or low-pass active filter and an amplifier, a pulse shaping amplifier with a quasi-gaussian filter can be formed.

In the above circuit arrangement, there are provided many amplifiers 7a1-7a4 with differentiators, so that if the shaping time constant $\tau$ is to be variable, selection of the time constant is troublesome and causes the pulse width and height of the outputs Vdx1-Vdx4 from the amplifiers to fluctuate with resulting complication and difficulty in control of timing and adjustment of the correction circuit to be described later. Therefore, the quasi-gaussian filter may be so arranged that the time constants of all the differentiators in the amplifiers 7a1-7a4 are fixed to $\tau_0$ and the integrator/amplifiers 132 includes a differentiator and an integrator with a variable time constant $\tau$, so that the time constant as a whole is variable within a range of $\tau \leq \tau_0$. In this case the differentiators in the amplifiers $7a1-7a4$ are needed in view of the correction rate characteristic since they function to limit the pulse width of the signals Vdx1–Vdx4 to a comparatively small width thereby to help shorten the time for the signals to pass through the analog multiplexer 100.

On the other hand, the auxiliary amplifier 133 has a characteristic to amplify high frequency components more than the integrator/amplifier 132. The auxiliary amplifier 133 comprises, for example, an ordinary amplifier with a constant amplification degree within a range from the DC component to a certain frequency, or a combination of a pulse shaping circuit with a shorter time constant than the time constant $\tau$ of the above-mentioned main amplifier (comprising a differentiator only or a differentiator and an integrator) and an amplifier. As a result, as compared with the signal Vg the signal Vd' has its pulse height more dependent on the charge collection time tr or the rise time of the outputs from the preamplifiers $6a1-6a4$.

Series noise can be reduced by providing the auxiliary amplifier 133 with an integrator having a short time constant or an integrator which integrates an input signal thereto for a predetermined short period of time a relatively short time after the rise of the signal. This arrangement, however, more or less reduces the dependence on tr.

The signals Vd' and Vg are applied to peak detection/hold circuits or pulse stretchers 141 and 140, respectively, which are controlled by timing signals a and b to produce signals Vd'max and Vgmax, respectively. The signal Vgmax is applied to a divider 110, a sample hold circuit 150 and a subtractor 114, to the last of which the signal Vd'max is also applied.

If, with respect to radiation events with the charge collection time tr≃0, a coefficient k is so selected that Vgmax=k·Vd'max, the subtractor 114 produces an output corresponding to (Vgmax−k·Vd'max), which is applied to the divider 110 so as to be divided by Vgmax for standardization, so that a signal is produced corresponding to the previously mentioned expression $$\Delta R \equiv (Vgmax - k \cdot Vd'max)/Vgmax \qquad (3)$$

where $\Delta R$ is a function of the charge collection time tr and independent of energy.

A sample hold circuit 151 is controlled by the timing signal c from the timing control circuit 22 to take in and hold the output from the divider 110, and the sample hold circuit 150 is controlled by the timing signal c to take in and hold the output Vgmax from the sample hold circuit 140.

The output $\Delta Rh$ from the sample hold circuit 151 is rendered non-linear by a non-linear amplifier 111 so as to be applied to a multiplier 109.

On the other hand, the digital position signals Dig.Xo and Dig.Yo from the latch circuit 13a and 13b are also applied to a correction memory 26. Upon application of the timing signal T6 the data in the memory 26 are read out and applied to a latch circuit 27 so as to be fixed therein by the timing signal T7. The fixed contents of the circuit 27 are converted by D/A converter 28 to an analog signal, which is applied to the multiplier 109. The multiplier 109 produces an output signal corresponding to the product of the analog signal and the output signal from the non-linear amplifier 111.

The output signal from the multiplier 109 and the output signal Vgmaxh from the sample hold circuit 150 are applied to a multiplier 112, which produces an output corresponding to the product of the two input signals. This output from the multiplier 112 and the signal Vgmaxh are applied to an adder 113 for appropriate weighting. A sample hold circuit 152 is controlled by the timing signal d to take in and hold the added signal from the adder 113 and produce an energy signal CORR.Vg, which is applied to a pulse height analyzer 29.

The analyzer checks whether the signal CORR.Vg is within a predetermined one or more energy ranges (windows), and if it is, the analyzer produces a signal ANALYZE to be applied to an unblanking signal generator 24 (FIG. 11(a)). If the signal ANALYZE coincides with the timing signal T9 also applied to the generator 24, it produces an unblanking signal UNBLANK to be applied to the CRT display 25.

The T2 signal generator 17 is so arranged that while it receives an input signal T1x (or T1y) and produces a corresponding output signal T2x (or T2y), it will not accept another signal T1x (or T1y) caused by an immediately succeeding radiation event for a period of time for dealing with the previous radiation event, and consequently will not produce signal T2x (or T2y) in response to the succeeding signal T1x (or T1y). To this end the T2 signal generator 17 may be provided with a flip-flop to form a flag.

After certain steps of processing the previous radiation event have been completed (and not all of the processing steps need be completed), when it is determined by the parity information that two or more of the trigger circuits $8a1-8a4$, $8b1-8b4$ have produced output signals simultaneously, or when the coincidence detection circuit 20 determines that the signals T1x and T1y do not coincide, a reset control circuit 21 applies a reset signal RESET to the T2 signal generators 17a and 17b to remove the previously mentioned inhibition on acceptance of input signals.

The principle of operation of correcting the energy signal is as follows:

The corrected energy signal CORR.Vg can be expressed by the previously mentioned expression (1). The correction coefficient f(tr) is a function of the information about the depth of the position of the radiation absorbed in the semiconductor detector element (for example, the distance from the event to the negative electrode surface), that is, a function of the charge collection time tr. Due to the previously mentioned factor (a) (incompleteness of charge collection) and factor (b) (the dependence of the output from the pulse shaping circuit on the rise time of the input thereto), normally the farther away from the negative electrode surface the position of radiation absorbed is, or in other words the longer the charge collection time tr is, the lower the height of the energy signal Vgmax tends to become, and the greater the correction coefficient f(tr) must be.

On the other hand, $\Delta R$ given as the expression (3) is also a function of tr and usually monotonously increases with respect to tr, so that $\Delta R \approx 0 \rightarrow 1$ for $tr = 0 \rightarrow \infty$. Therefore, as shown by the solid line curves I, II in FIG. 12(a) (which have been caused by a semiconductor element consisting of relatively good crystal and a semiconductor element consisting of relatively bad crystal, respectively), the correction coefficient f(tr)

can be expressed as a function Q(ΔR) of ΔR. Therefore, the optimum ΔR characteristic of f(tr)≡Q(ΔR) is measured beforehand, and a conversion characteristic approximately equivalent to the non-linear characteristic obtained by the measurement may be given to the non-linear amplifier 111.

Figure 12A:
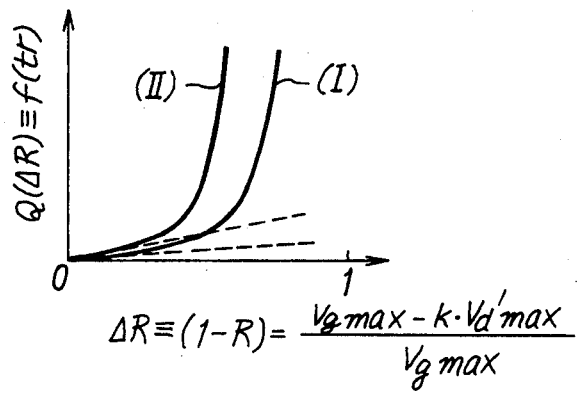
FIGS. 12(a) and 12(b) are graphs for explanation of the operation of the position-sensitive radiation detector.

However, the previously mentioned factor (a) or incompleteness of charge collection varies with different detector elements 1$_{11}$–1$_{44}$ even when tr is the same. For example, as shown in FIG. 12(a) the lower the quality of the crystal of the element is (strictly, the higher the concentration of the positive hole trapping center is), the greater the incompleteness of charge collection is, so that the correction coefficient f(tr) must be increased. Since $f(tr)=Q(\Delta R)$ generally is non-linear with respect to ΔR, strictly not only the gain of Q(ΔR) but also the dependence of ΔR would have to be changed in accordance with the quality of the crystal. This would result in complication of the circuitry. Therefore, in FIG. 11(b) only the gain of Q(ΔR) is changed, and correction of the correction coefficient is approximately correct within a range of relatively small values of tr.

The optimum amount of correction of the gain of Q(ΔR) determined beforehand for each detector 1$_{11}$–1$_{14}$ is stored in the correction memory 26.

Figure 13:
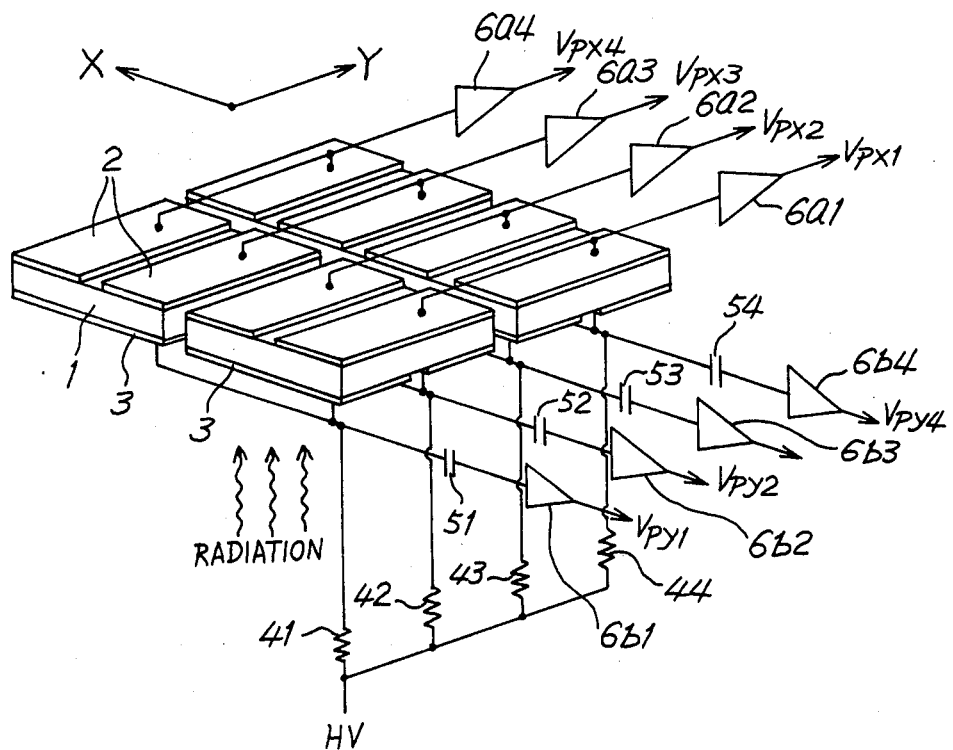
FIG. 13 is a schematic perspective view of a different form of the detecting portion.

In the arrangement of FIGS. 11(a) and 11(b) one picture element for detection corresponds to each of the semiconductor elements 1$_{11}$–1$_{44}$. One-to-one correspondence, however, need not always exist between the picture element and the semiconductor element. FIG. 13 shows a 2×2 matrix of detectors each having a checkerboard type of 2×2 electrodes.

In the above explanation, for convenience of explanation the picture elements are arranged to form a 4×4 matrix. Any other suitable arrangement of picture elements may also be employed.

Usually radiation is introduced in the direction perpendicular to the electrode surface. It may also be introduced in the direction parallel thereto.

A different circuit arrangement from the one shown in FIGS. 11(a) and 11(b) may also be used. For example, the amplifiers 7a1–7a4, 7b1–7b4 or the trigger circuits 8a1–8a4, 8b1–8b4 may be arranged differently with respect to the X and Y directions. The threshold voltage VTH may differ with respect to the X and Y directions.

The energy signal Vg may be formed on the basis of the signals Vdy1–Vdy4 instead of the signals Vdx1–Vdx4, or the sum of the two signals.

Since the integrator/amplifier 132 usually has a longer propagation time than the auxiliary amplifier 133, a delay circuit may be added to the auxiliary amplifier 133 to adjust the timing.

The count rate may be improved by, for example, providing additional sample hold circuits which take in and hold the outputs Vgmax and Vd′max from the peak detection/hold circuit 140 and 141, respectively, thereby to increase buffers.

Through A/D conversion of the signals Vgmax and Vd′max, the succeeding correction circuit and other circuits may be so arranged as to enable digital operations.

Figure 12B:
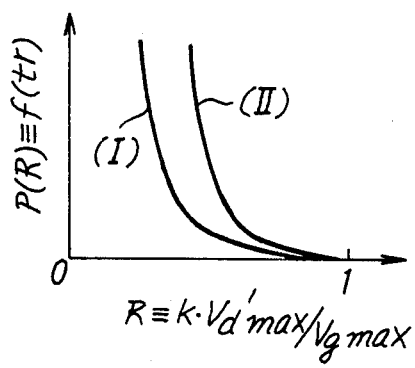

The curves in FIG. 12(a) can be expressed as the curves in FIG. 12(b). If $$R=k \cdot Vd'max/Vgmax=1-\Delta R \qquad (6),$$

correction coefficient f(tr) can be expressed as a function P(ΔR) of ΔR. In this case, the subtractor 114 in FIG. 11(b) is removed so that the output from the divider 110 corresponds to R in expression (6) instead of ΔR in expression (3) thereby to change the conversion characteristic of the non-linear amplifier 111.

As previously mentioned, within a range of relatively small values of ΔR we have $$Q(\Delta R)=f(tr)\approx \alpha \cdot \Delta R \qquad (4),$$

and substitution of expressions (3) and (4) into expression (1) yields $$CORR.Vg \approx Vgmax + \alpha(Vgmax - k \cdot Vd'max) \equiv CORR.Vg' \qquad (5)$$

Figure 14:
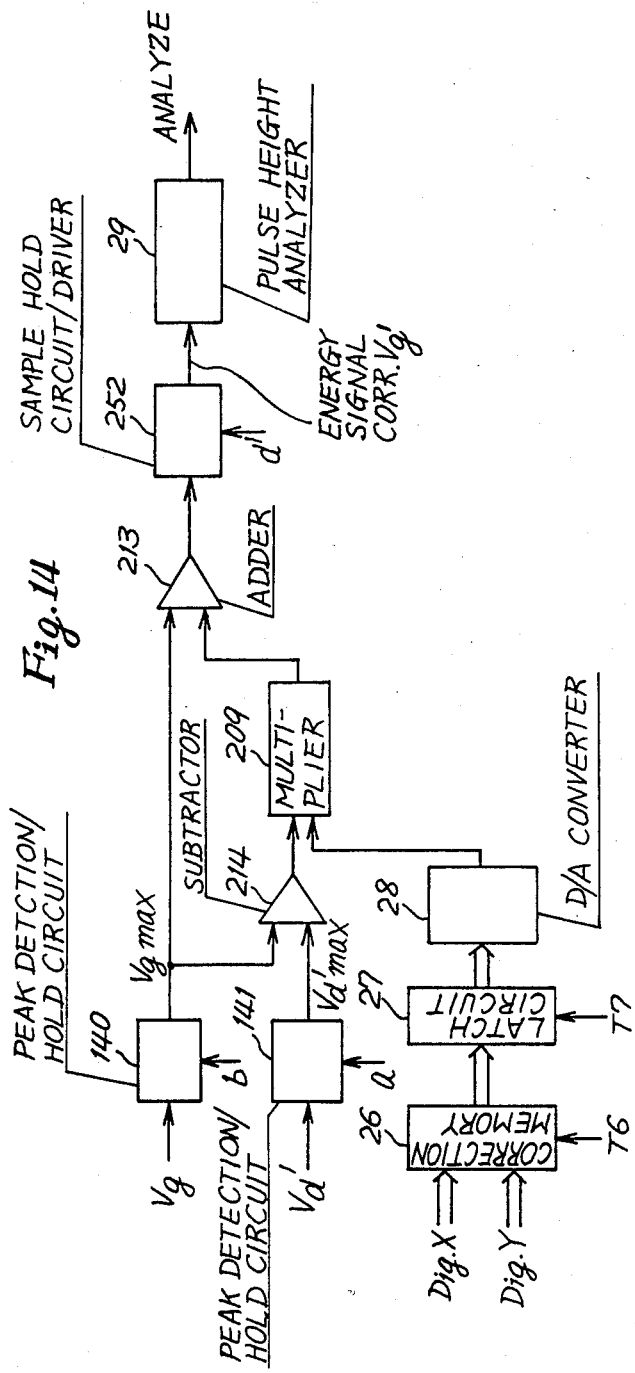
FIG. 14 is a schematic block diagram of a different form of a portion of the signal processing system.

A circuit arrangement for this approximation is shown in FIG. 14, wherein peak detection/hold circuits 140 and 141, a correction memory 26, a latch circuit 27, a D/A converter 28 and a pulse height analyzer 29 are provided as in FIG. 11(b). The timing control circuit 22 provides a timing signal d′ instead of the timing signals c and d.

The signals Vgmax and Vd′max are applied to a subtractor 214, which produces an output signal corresponding to (Vgmax−k·Vd′max). This signal and the output signal from the D/A converter 28 is applied to a multiplier 209, which produces an output signal corresponding to the product of the two input signals. The output signal from the multiplier 209 and the signal Vgmax are applied to an adder 213 for summation with appropriate weights. A sample hold circuit 252 controlled by the timing signal d′ takes in and holds the signal from the adder 213 and produces an energy signal CORR.Vg′.

Instead of using the quasi-gaussian filter as the pulse shaping circuit (filter) in the main amplifier, a pseudo-trapezoidal filter comprising a combination of a quasi-gaussian filter and a gated integrator as shown in FIG. 4 may be used. With the above-mentioned pseudo-trapezoidal filter, the accuracy of correction and the count rate can be improved.

The amplifier including an integrator refers to the integrator/amplifier 132 in FIG. 11(b) and to the combination of the integrator/amplifier 132 and a gated integrator 160 in FIG. 4. Filters other than the quasi-gaussian filter and the pseudo-trapezoidal filter may also be used as the pulse shaping circuit in the main amplifier.

In the circuit arrangement shown in FIGS. 11(a) and 11(b), the count rate characteristic of the whole system can be improved by, for example, replacing the discriminator in each of the trigger circuits 8a1–8b4 by a single-channel analyzer, or changing the threshold voltage VTH in accordance with the lower limit level of the energy windows of the pulse height analyzer 29, or providing a preliminary pulse height analyzer (having wider energy windows than the pulse height analyzer 29) for the output signal from the analog multiplexer 100 or the signal Vd′ or Vg.

As previously mentioned, the arrangement shown in FIGS. 11(a) and 11(b) for correction of the correction coefficient is merely an approximation. If a higher degree of correction is required due to a marked non-linearity, correction may be made, for example, by means of a memory circuit so arranged that the memories are addressed by the energy signal to produce an output with a value sendered non-linear and at the same time directly or indirectly by the digital position signals to determine which memories in the memory circuit are to be used.

In the above description, the energy signal obtained at each radiation event is corrected by the informaiton about the charge collection time, with the degree of correction being changed in accordance with the digital signals corresponding to the detected position of each radiation event. Instead of correcting the energy signal, it is also possible to change the level signal which defines the energy window (range) of the pulse height analyzer, or amplify the signal with different gains in accordance with the information about the charge collection time at each radiation event, or address a memory by using corresponding digital position signals and adjust the degree of correction of the above-mentioned level signal in accordance with the data read out from the memory at each radiation event.

An annular or hexagonal arrangement of two-dimentional radiation detectors as mentioned above may be used as a detector in a multi-slice type emission CT.

What I claim is:

1. A semiconductor position-sensitive radiation detector, comprising:
   (a) radiation detecting means comprising a plurality of radiation detecting elements each made of a compound semiconductor and having a positive and a negative electrode and operable at room temperature, said radiation detecting elements being so arranged in row and column as to form a matrix;
   (b) digital position signal producing means comprising:
      (b-1) a first group of preamplifiers each connected through a common line to said radiation detecting elements in each row of said matrix at one of said positive and negative electrodes so as to produce a first detection signal caused by a radiation event detected by each of said detecting elements in each row of said matrix,
      (b-2) a first group of differentiator/amplifiers each connected to one of said first group of preamplifiers,
      (b-3) a first group of discriminators each connected to one of said first group of differentiator/amplifiers to produce a first digital pulse signal,
      (b-4) a first encoder for encoding said first digital pulse signal to produce a first digital position signal,
      (b-5) a second group of preamplifiers each connected through a common line to said radiation detecting elements in each column of said matrix at the other of said positive and negative electodes so as to produce a second detection signal caused by a radiation event detected by each of said detecting elements in each column of said matrix,
      (b-6) a second group of differentiator/amplifiers each connected to one of said second group of preamplifiers,
      (b-7) a second group of discriminators each connected to one of said second group of differentiator/amplifiers to produce a second digital pulse signal, and
      (b-8) a second encoder for encoding said second digital pulse signal to produce a second digital position signal;
   (c) coincidence detecting means for checking whether said first and second detection signals coincide within a predetermined period of time to produce an output signal only when coincidence is detected;
   (d) energy signal providing means including an analog multiplexer connected through a delay circuit to each of said differentiator/amplifiers in at least one of said first and second groups to produce an output, and an integrator/amplifier receiving said output from said multiplexer, said differentiator/amplifiers and integrator/amplifier being combined to form a main amplifier to produce an energy signal;
   (e) a pulse height analyzer for determining whether said energy signal is within at least one energy window;
   (f) means for amplifying high frequency components with a higher gain than said integrator/amplifier, said amplifying means including an auxillary amplifier and being connected to the output of said multiplexer in parallel with said integrator/amplifier, and a circuit for comparing a height of an output from said auxiliary amplifier and of the output from said integrator/amplifier, in order to obtain information about the charge collection time at each radiation event detected by said detecting elements;
   (g) means for correcting said energy signal relatively with respect to said energy window of said pulse height analyzer in accordance with said information about charge collection time at each radiation event, in order to improve energy resolution which would otherwise be deteriorated by incomplete charge collection; and
   (h) means for adjusting a degree of correction by said correcting means at each radiation event in accordance with contents read out from a memory addressed by said digital position signals obtained at each radiation event.

2. The position-sensitive radiation detector of claim 1, wherein said correcting means comprises means for changing said energy signal in accordance with said information about charge collection time, and means for adjusting the degreee of correction of said energy signal.

3. The position-sensitive radiation detector of claim 1, wherein said correcting means comprises means for changing a level signal which defines the energy window of said pulse height analyzer in accordance with said information about charge collection time, and means for adjusting the degree of correction of said level signal.

4. The position-sensitive radiation detector of claim 2, wherein said correcting means comprises means for amplifying said energy signal with a different gain in accordance with said information about charge collection time, and means for adjusting the degree of correction of said energy signal.

5. The position-sensitive radiation detector of claim 3, wherein said correcting means comprises means for amplifying said level signal with different gain in accordance with said information about charge collection time, and means for adjusting the degree of correction of said level signal.

* * * * *